United States Patent [19]
Punwani et al.

[11] 3,892,682
[45] July 1, 1975

[54] SINGLE REACTOR FLUIDIZED BED OXYGEN ENRICHMENT PROCESS AND APPARATUS

[75] Inventors: Dharamvir Punwani, Chicago, Ill.; Lester G. Massey, Moreland Hills, Ohio; Paul B. Tarman, Elmhurst, Ill.

[73] Assignee: Consolidated Natural Gas Service Co., Inc., Cleveland, Ohio

[22] Filed: Mar. 30, 1973

[21] Appl. No.: 346,570

[52] U.S. Cl. .............................. 252/186; 252/372
[51] Int. Cl. .......................................... C01b 13/00
[58] Field of Search ........................... 252/186, 372

[56] References Cited
UNITED STATES PATENTS

| | | | |
|---|---|---|---|
| 3,324,654 | 6/1967 | Squires | 60/39.02 |
| 3,579,292 | 5/1971 | Mullhaupt et al. | 252/186 |
| 3,773,680 | 11/1973 | Huebler et al. | 252/186 |
| 3,812,048 | 5/1974 | Massey et al. | 252/186 |

*Primary Examiner*—Benjamin R. Padgett
*Assistant Examiner*—B. H. Hunt
*Attorney, Agent, or Firm*—Molinare, Allegretti, Newitt & Witcoff

[57] ABSTRACT

Process and apparatus for fluidized bed production of oxygen enriched air by reversible oxidation and reduction of oxygen accepting compositions. The process is particularly characterized by use of a single reactor and lift line having a special gas-solids disengaging hopper. The product enriched air may have up to about 75 mole % $O_2$. The reactor may be used either as the oxidizer or as the reducer (preferred) in alternate embodiments, with reduction or oxidation (preferred), respectively, occurring in the lift line and hopper system. The apparatus and process employs a ratio of pressure during oxidation pressure during reduction of between about 1.5 and 10, with a more preferred ratio being 1.5–8.0, and most preferred ratio of 1.5–7.0. The maximum pressure during reduction should not exceed about 15 psia. Oxidation temperature ranges from about 1100° to about 1500°F, and reduction temperature ranges from about 1250° to 1550°F. Residence time of bed particles during the oxidation ranges from about 1 second to 10 minutes, and about 5 seconds to 15 minutes during reduction. Bed particle size ranges from about 200 mesh to 1/16 inch ×1/16 inch. The process preferably employs compacted pellets or particles of a barium oxide with dolomitic quicklime as the oxygen-accepting fluidized bed composition to prevent plating out of the barium. The apparatus also employs a third compressor system which induces subatmospheric pressure on the reduction side of the process permitting a relatively short seal leg, and a cyclone system for removing attrition dust and controlling the bed particle size.

30 Claims, 2 Drawing Figures

SINGLE REACTOR FLUIDIZED BED OXYGEN ENRICHMENT PROCESS AND APPARATUS

CROSS-REFERENCE TO RELATED APPLICATIONS

This application is generally related to co-pending applications Ser. Nos. 242,153, now U.S. Pat. No. 3,773,680 and 241,957, now U.S. Pat. No. 3,812,098, both filed Apr. 7, 1972, entitled "Acceptor Compositions and Method for Oxygen Enrichment Processes" and "Oxygen Process Pellets", respectively. This application is also related to co-pending application Ser. No. 260,449 now U.S. Pat. No. 3,856,928 filed on June 7, 1972, entitled "Oxygen Production Process and Apparatus", and to co-pending application Ser. No. 277,769 filed on Aug. 3, 1972, entitled "Preparation of Oxygen Acceptor Compositions and Oxygen Production Process". This application is also related to co-pending application Ser. No. 277,768 now abandoned filed on Aug. 3, 1972, entitled "Low Pressure Fluidized Bed Oxygen Enrichment Process and Apparatus". The disclosures of those applications are incorporated herein by reference for details of the oxygen accepting solids, and general methods of use and preparation.

FIELD OF THE INVENTION

This invention relates to a fluidized bed chemical-type process and apparatus for enrichment of air up to about 75 mole % $O_2$ by reversible oxygen-accepting compositions. The process is particularly characterized by use of a single reactor and lift line having a special gas-solids disengaging hopper. The reactor may be used either as the oxidizer or as the reducer (preferred) in alternate embodiments with reduction or oxidation (preferred), respectively, occurring in the lift line and hopper system. Typical compositions employ a barium oxide with MgO and CaO, for example, $BaO_2$ with dolomitic quicklime (DQL). The process involves a continuously moving fluidized bed of particles of the above composition, which particles are specially prepared to prevent plating out of the barium metal on the wall of the reactor vessels during the operation. The process also involves specific ratios of oxidation pressure to reduction pressure. The apparatus is characterized by use of a single reactor, sub-atmospheric pressure during the reduction, and a cyclone system for attrition dust removal and bed particle size control. The process and apparatus of this invention permits feasible commercial production of an enriched air product containing from about 22–75 mole % oxygen for use in a variety of industrial processes.

BACKGROUND OF THE INVENTION

Industry has long sought an economical method of chemically producing enriched air. Enriched air may be used in combustion processes, or as a chemical reactant in other types of processes. Typical processes in which enriched air may be used include steel making, glass making, aerobic fermentation processes, sewage treatment, and various combustion processes.

There are basically two methods for the production of oxygen or enrichment of air: chemical processing, and mechanical compression followed by cryogenic separation of oxygen or a fraction of air enriched with oxygen. This application concerns chemical processes, which involve the use of a bed of a compound which has a capability of "absorbing" oxygen from air and later under a change of conditions "desorbing" the oxygen to deliver the oxygen for use. As noted by use of quotation marks, the prior art loosely uses the terms absorption and desorption in connection with bed materials, such as barium oxides. However, as set forth in the above-identified co-pending application, it has been concluded that since the chemical reaction occurs in reversibly transforming solid barium oxide to barium peroxide, the term absorption appears to be a misnomer. While we do not wish to be bound by terminology, we believe that the term "acceptor" more generically describes what happens to the mixtures employed in this invention during operation, whether the reversible, temporary binding of the oxygen be physical adsorption, or chemical binding of various types. Thus, the use of the term acceptor solids includes the use in the present process and apparatus of the prior so-called absorbent bed materials.

The classical 19th Century absorption processes of Brin and DuMotay involve the reversible absorption-desorption of oxygen by chemical compounds under controlled conditions of temperature and pressure. The DuMotay process of 1866 involves the use of sodium manganate which may be in liquid form. This process remains essentially a laboratory curiosity, and is not a significant commercial process.

More recently, Squires U.S. Pat. No. 3,324,654 shows a Brin-type process for the simultaneous production of oxygen and power wherein the compressed air is let down through an expansion turbine to recover energy values in the compressed air. The oxygen absorbing bed is a solid composed of an intimate intermingling of tiny crystallites of barium oxide and magnesium oxide. In the process, the bed must be mixed periodically, as by rabbling, but was not continuously fluidized, nor passed through special zones. The crystallites are prepared from a co-precipitated barium carbonate and magnesium carbonate mixture which is pelletized with active carbon and, optionally, a starch paste binder. These pellets are dried and heated to 1200°F under a CO atmosphere to decompose the $MgCO_3$ to form MgO, and then further heated to 1750° to 1800°F under $O_2$, $CO_2$ and $H_2O$-free conditions to "react" the carbon with the $BaCO_3$. Any excess carbon is burned away by exposing the hot solid to a low concentration $O_2$ stream.

In a recent publication, Moriarty, John L., Jr., *The Effects of Catalytic or Promotor Oxides on The Brin Process*, Proc. Iowa Acad. Sci. 77, 360–78, Apr. 10, 1971, the influence of eighteen oxides as reaction promotors was studied and the results of 40 admixture experiments (apparently binary mixtures) were evaluated. The experimental evidence reported there by Moriarty led him to state that it "supports the conclusion that the reversible $BaO$-$BaO_2$ reaction is not, in general, substantially improved by the employment of foreign oxide additions". BaO was mixed, in several types of preparations, with the following oxides: $La_2O_3$, MgO, $Fe_2O_3$, CoO, CuO, CdO, $SiO_2$, $CeO_2$, $Al_2O_3$, ZnO, NiO, CaO, SrO, $Ag_2O$, $MnO_2$, PbO, HgO, and $Na_2O_2$. Moriarty reported that $La_2O_3$ and MgO increases the oxygen yield rate when mixed with BaO, but that the physical arrangement of the apparently static reaction bed and rapid evacuation procedures appeared critical.

Oxygen production by the use of fluidized or partly fluidized beds of various types of oxygen acceptor compositions are taught in Parker U.S. Pat. No. 3,121,611.

Enrichment of air is not disclosed. The preferred bed materials are manganese oxides used alone or with mill scale, sand or alumina as a heat carrier. Sodium manganate, silica gel having chromium trioxide absorbed thereon, and red lead ($Pb_3O_4$) are also given as examples. The Parker process employs an inert gas during the desorption (reduction) reaction to reduce the partial pressure of oxygen in the product gas. Steam is preferred, with oxygen being suggested as an alternative even though the latter would not reduce the partial pressure of $O_2$ as required for the process.

The Parker process utilizes plural reactors, operating at atmospheric pressure in both the reactor (desorber or reducer) and the regenerator (absorber or oxidizer), and thus the oxidation/reduction pressure ratio is 1. The bed materials flow in a countercurrent discontinuous stream through both reactors. A single reactor fluid bed process is not disclosed.

Parker suggests barium oxides may be used in his process with the observation that steam may not be employed. However, no details or examples of use of barium are given, and Parker states that operation is less advantageous with Group II elements, which, of course includes Ba, Ca, or Mg compounds. In discussing prior art, Parker states that fluidized beds were previously applied to manganese dioxide processes. parker also notes that in prior isothermal processes, the oxidation (absorption)/reduction (desorption) pressure ratios must be about 15–30.

In addition to the fact that heretofore used acceptor compositions have had relatively low activity, fluidized beds pose problems of loss of acceptor materials due to attrition of the acceptor bed material or loss of chemical activity, and the fact that the apparatus must be extremely large, and normally employ a plurality of reactors. A key factor in the size of the apparatus is the differential pressure between the two reactor vessels which would normally be involved in fluidized bed oxygen production. A seal leg is required between the two reactors. Where the pressure differential between the reactors would be great, the seal leg length must increase in order to prevent back pressure blowout.

In the unrelated art of catalytic cracking, seal legs are used in fludized bed operation, but only where the pressure differential between the two stages is about 10 psi or less. However, a differential of 10 psi in the prior art processes of oxygen production utilizing plural fixed bed reactors would not be sufficient to provide oxygen quantities for commercial production. Conversely, an increase in the pressure differential to the prior art preferred range as above described for oxygen production would make the seal legs so long that the apparatus could reach several hundred feet in height. Further, a large pressure differential also means that the total energy to operate the system becomes prohibitively expensive.

The prior art use of manganese dioxide or sodium manganate and steam in fluidized beds does not apply to barium oxides since steam irreversibly reacts with both BaO and $BaO_2$, forming a hydroxide, and completely deactivates the barium acceptor solid.

Barium peroxide also has the unfortunate property of becoming "tacky" or sintering at elevated temperatures, which results in plating out of barium on hot surfaces, and formation of growing clinkers which plug a fluidized system. These problems are among the reasons why none of the prior art processes are currently in commercial use today for the chemical production of oxygen employing barium compounds as components of oxygen acceptor compositions.

There is thus a need for a reliable and economical chemical process for enrichment of air with oxygen, and preferably one which can take advantage of the process dynamics and economics of fluidized bed operation, yet can avoid the need for expensive, large dual reactors.

THE INVENTION

OBJECTS

It is among the objects of this invention to provide an improved low pressure process for the enrichment of air by means of oxygen acceptor compositions which are able to be used in a fluidized process employing a single reactor.

It is another object of this invention to provide an improved oxygen enrichment process of the chemical type employing barium oxides in fluidized beds, wherein the pressure during the reduction is subatmospheric.

It is another object of this invention to provide improved oxygen processes of the fluidized nature which are commercially practicable, reliable, and utilize minimum total process energy.

It is another object of this invention to provide a chemical process and apparatus for the enrichment of air in a fluidized bed system employing different pressures in different sections or zones of the fluidized bed, and wherein the pressure ratio between oxidation and reduction sections or zones is kept within defined limits.

It is another object of this invention to provide an improved process and apparatus for the enrichment of air which employs a single reactor with a lift leg having a special solids-gas disengaging hopper, a third compressor, seal leg, and cyclone system.

Still further and other objects of this invention will become evident from the detailed description which follows.

SUMMARY OF THE INVENTION

The process is particularly characterized by use of a single reactor and lift line having a special gas-solids disengaging hopper. The product enriched air may have up to about 75 mole % $O_2$. The reactor may be used either as the oxidizer or as the reducer (preferred) in alternate embodiments, with reduction or oxidation (preferred), respectively, occurring in the lift line and hopper system. The apparatus and process employs a ratio of pressure during oxidation/pressure during reduction of between about 1.5 and 10, with a more preferred ratio of 1.5–7.0. The maximum pressure during reduction should not exceed about 15 psia. Oxidation temperature ranges from about 1100° to about 1500°F, and reduction temperature ranges from about 1250° to 1550°F. Residence time of bed particles during the oxidation ranges from about 1 second to 10 minutes, and about 5 seconds tob 15 minutes during reduction. Bed particle size ranges from about 200 mesh to 1/16 × 1/16 inch. The process preferably employs compacted pellets or particles of a barium oxide with dolomitic quicklime as the oxygen-accepting fluidized bed composition to prevent plating out of the barium. The apparatus also employs a third compressor system which induces subatmospheric pressure on the reduction side of the process permitting a relatively short seal leg, and a cyclone system for removing attrition dust and controlling the bed particle size.

While the compositions employed in the process of this invention are not per se a part of this invention, we prefer to use the compositions disclosed as claimed in co-pending applications Ser. Nos. 242,153, 241,957, 260,449, and 277,769; the first two being filed on Apr. 7, 1972, the third on June 7, 1972, and the latter on Aug. 3, 1972. The above applications set forth the discovery of new oxygen acceptor compositions and methods of their use and manufacture. These compositions employ $BaO_2$ in conjunction with CaO and MgO-containing solids, such as dolomitic quicklime (hereinafter DQL). Such compounds show increased and unexpected results when used in chemical-type oxygen production and enriching processes.

Typically, the preferred compositions which may be employed in this invention comprise a physical mixture of finely ground barium peroxide and dolomitic quicklime in which the weight percent of the dolomitic quicklime ranges up to about 92%. The particle size of the barium peroxide in the composition mixture is preferably smaller than about 100 mesh, while the DQL is preferably smaller than about 40 mesh. In a first method of preparation of the compositions starting from DQL as set forth in copending Ser. No. 242,153, the DQL must be prepared under conditions to insure that the final carbonate content of the $BaO_2$-DQL mixture is such that the mole ratio of carbon dioxide to barium peroxide is less than 1.0. Commercially available materials which are relatively $CO_2$-free can be used so long as the critical content of $CO_2$ is kept below the amount above specified. In a second method of preparation set forth in Ser. No. 277,769 a special heating schedule, first under dry, $CO_2$-free inert gas and then under dry, $CO_2$-free $O_2$ or air is used to convert $BaCO_3$ and dolomite to a final $BaO_2$-DQL type composition.

In addition, the use of barium peroxide instead of barium oxide in the mixture with DQL is important to reduce inactivity and shortening of lifetime of the acceptor materials due to hydration and carbonation. Thus, the initial bed material is provided such that the barium is in an oxidized state, and this process involves termination of the process, for reasons of shutdown for repairs and the like, in the oxidation stage to ensure the barium is in the peroxide state.

The mixture of the oxygen acceptor compound components, the barium peroxide with a compound of the oxides of Mg and Ca, may be compacted with or without the use of an inert binder material. By "inert binder", we mean any binder which acts to promote adhesion of the particles of the Mg or Ca oxides or dolomite materials to the $BaO_2$ or $BaCO_3$ particles without substantially inactivating the oxygen accepting properties of the barium oxides. This includes a permissible range of some deactivation, but not a reduction of the oxygen production below a SORT conversion percentage $XX[1.477+61.01t]\frac{1}{2}-1.2153$, as defined in the above-identified co-pending application Ser. No. 241,957. This definition also includes binders which act as adjuvants. As in the $BaCO_3$-starting material process of preparation set forth in Ser. No. 277,769, one may pre-pelletize before the conversion to $BaO_2$-DQL, or pelletize powders after conversion.

However, important to the operation of the process of the present invention is that the fluidized bed material should be ground and repelletized one or more times to improve the distribution of the Ba, Mg and Ca oxide components. This also prevents sintering of the bed and plating out of the barium on the walls of the reactors and transfer legs. After repelletizing, the pellets may be ground or crushed to the desired size distribution for use in the fluidized bed. In the process, attrition fines are collected before they become dust, and their removal from the system is regulated to keep bed particle size within the desired range.

The DQL may be obtained from a commercial source or derived from a natural, domestic dolomite. The DQL should be assayed for $CO_2$ content after calcining and crushing, or upon receipt in case of commercial DQL, to ensure meeting the criteria for the final mixture. Likewise, the $BaO_2$ should be routinely assayed to determine its carbon dioxide content is low enough to assure negligible loss of activity. Initial starting mixtures having a weight % ratio of $DQL/BaO_2$ ranging from about 90/10–30/70 may be used with the preferred range being from about 85/15 to 65/45. Unless otherwise noted, the remaining description is with reference to a final composition of 70/30 $DQL/BaO_2$.

It should also be understood that any standard means for drying the inlet air and removing carbon dioxide to very low levels may be employed. As an option in the process of this invention, one may use barium monoxide guard reactors which are disposed between conventional $CO_2$ and $H_2O$ removal means and the fluidized bed reactors containing the oxygen acceptor bed material. The special guard reactors not only act as a safety feature, but also are capable of removing residual water and $CO_2$ from the 10 ppm level in the conventional air drying means down to substantially 0 ppm. Since barium oxides are deactivated by moisture or $CO_2$ it is essential that gases passing through the bed materials should be dry. Thus, steam or $CO_2$ cannot be used in conjunction with these oxides in the process of this invention.

THE FIGURES

The invention is described below in more detail with reference to the figures which show, partly in section and partly schematically, the apparatus and process of this invention employing fluidized beds of a barium oxide-containing oxygen acceptor composition, and in which:

FIG. 1 illustrates a preferred embodiment of this invention wherein the reactor is used as the reductor and oxidation occurs in the lift leg-hopper system; and FIG. 2, shows another embodiment wherein the reactor is used for oxidation and the lift leg-hopper system for reduction.

DETAILED DESCRIPTION

Figure 1:
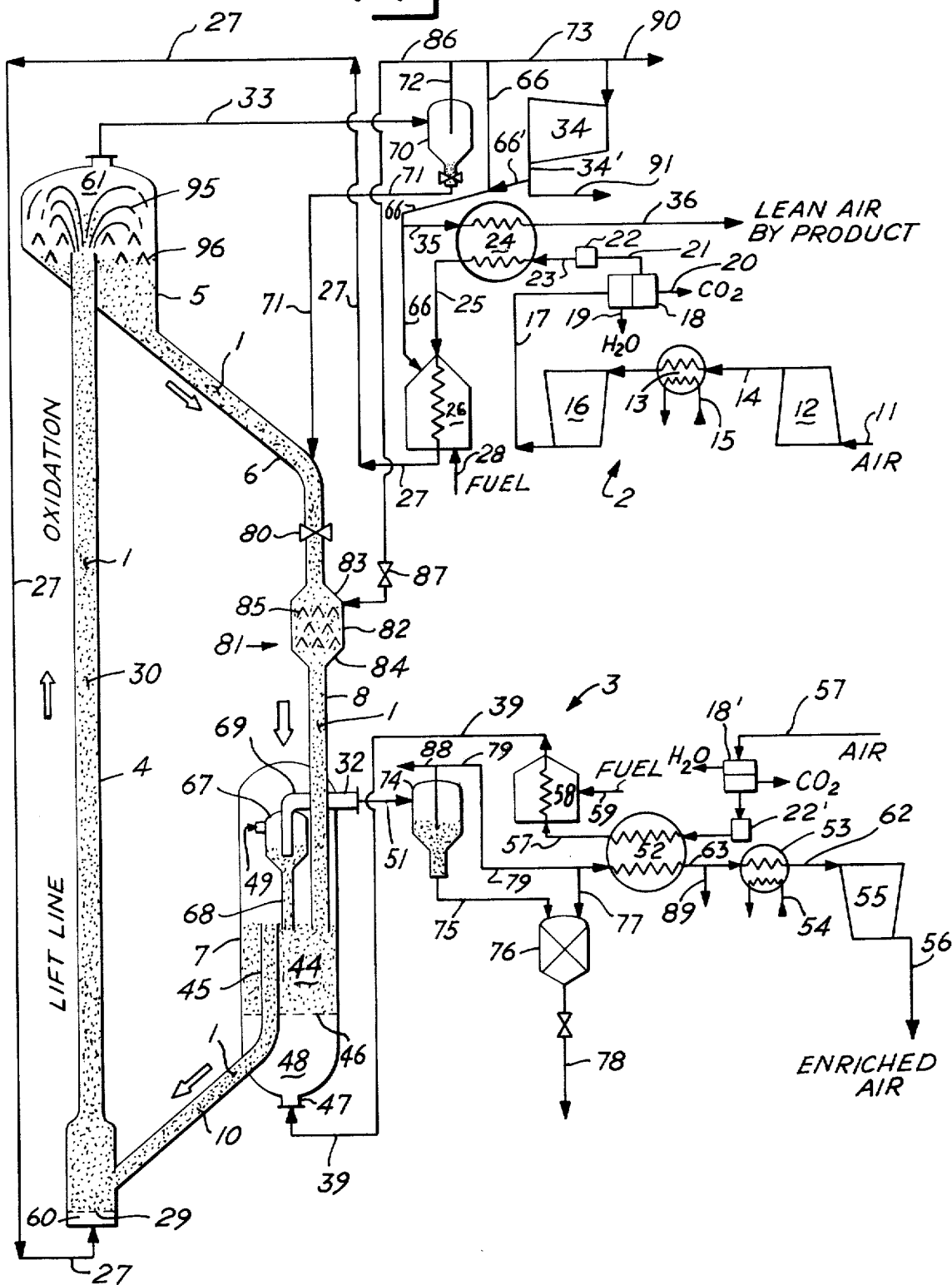

The following detailed description should be taken as illustrative and not limiting of the scope of this invention. Both figures show a continuously moving, continuous stream of an oxygen acceptor solid 1, e.g. a barium oxides acceptor composition, having a particle size in the range of from about 200 mesh up to about 1/16 inch × 1/16 inch. The preferred size ranges from about 40–100 mesh. The bed particles are prepared from a $DQL/BaO_2$ composition of 70/30 weight % ratio which may be dry pelletized in a standard pellet forming machine into pellets of about ¼ inch diameter by 3 inches long. Alternately, pellets of BaCO₃-Dolomite may be converted to the 70/30 DQL/BaO₂ pellets. The pellets are then crushed, and the crushed powders are repelletized to the same size pellets. These "repelletized" pellets are then recrushed to particles within the above size range.

The apparatus comprises the following parts: oxidation preparation assembly 2 is for the pressurizing and heating of inlet air for input into the oxidation zone (reactor or lift leg, depending on embodiment) during the oxidation phase of the process. Reduction air preparation assembly 3 comprises the apparatus for preparation of air for the reduction phase of the process. The remaining apparatus includes a lift (up) leg 4, a special gas/solid disengaging hopper 5, a delivery leg 6, a single vessel (reductor 7 in FIG. 1, oxidizer 9 in the FIG. 2 embodiment), and an overflow leg 10. In operation, the bed particles 1 flow clockwise in the system, being carried by air in the lift leg, and by gravity in the down leg.

It is important in our process that the pressure in the oxidizing zone be kept within certain limits as compared to the pressure in the reducing zone. Thus, we define the ratio of pressures in the oxidizing zone to those in the reducing zone as falling within the range of from 1.5–10.0, and the upper limit of reduction pressure being about 15 psia, that is, about atmospheric pressure after allowing for pressure loss in assembly 3. Thus, for example where the pressure in the reducing zone (e.g. reductor 7 in FIG. 1, and lift leg 4' and hopper 5' in FIG. 2) is one atmosphere, that is 15 psia, the pressure in the oxidizing zone (e.g. lift leg 4 and hopper 5 in FIG. 1, and oxidizer in FIG. 2) should be within the range of from 1.5 atmospheres to 10 atmospheres, that is 22 psia to 150 psia. A more preferred range of ratios of pressure in the oxidizing zone to that in the reducing zone is from 1.5 to 8.0, and most preferably 1.5 to 7.0. It should be understood that the pressure in the reducing zone is sub-atmospheric as defined above, preferably on the order of 4 to 10 psi, or lower, but not so low that the horsepower requirements of the compressor 55 in the reduction stage air preparation assembly 3 becomes so large that the process is uneconomical. Generally, as the pressure in the reduction zone becomes lower, the product gas becomes richer in terms of oxygen content. For enriched air of oxygen concentration on the order of from 22–45 mole %, the pressure in reduction 7 (FIG. 1), or lift leg 4' - hopper 5' (FIG. 2) would be in the range of from about 5.3 to 10 psia, and for higher oxygen concentrations may reach as low as about 2 psia. For example, 75 mole % oxygen requires pressure of about 3.0 psia at 1300°F.

The ratio of pressures is more important to producing enriched air than the absolute value of the pressure differential. Whereas the prior art has suggested that a large pressure differential is important to producing enriched oxygen in a chemical process, and the greater the differential pressure the better the production, we have found that even with low absolute values of pressure differential, this process may produce air of highly enriched oxygen content if the pressure ratio between the oxidizing zone and reducing zone is kept within the limits above-stated. Referring to FIG. 1 for example, where the pressure ratio is kept at about 6.3, with a pressure above the bed zone in the reductor 7 of about 6.7 psia, the maximum pressure above the bed zone in the hopper 5 would be about 42.3 psia, the seal leg 10 length is then 58 feet, and that equals the difference in pressure, 36.7 psi, between the bottom of lift line 4 and the space 49 in reaction 7. It should be understood that in FIG. 1 the height of legs 6 and 8 may be arbitrary and depends somewhat on equipment layout. The angle of leg 6 should not be less than the angle of repose (to the horizontal) for these solids.

Figure 2:
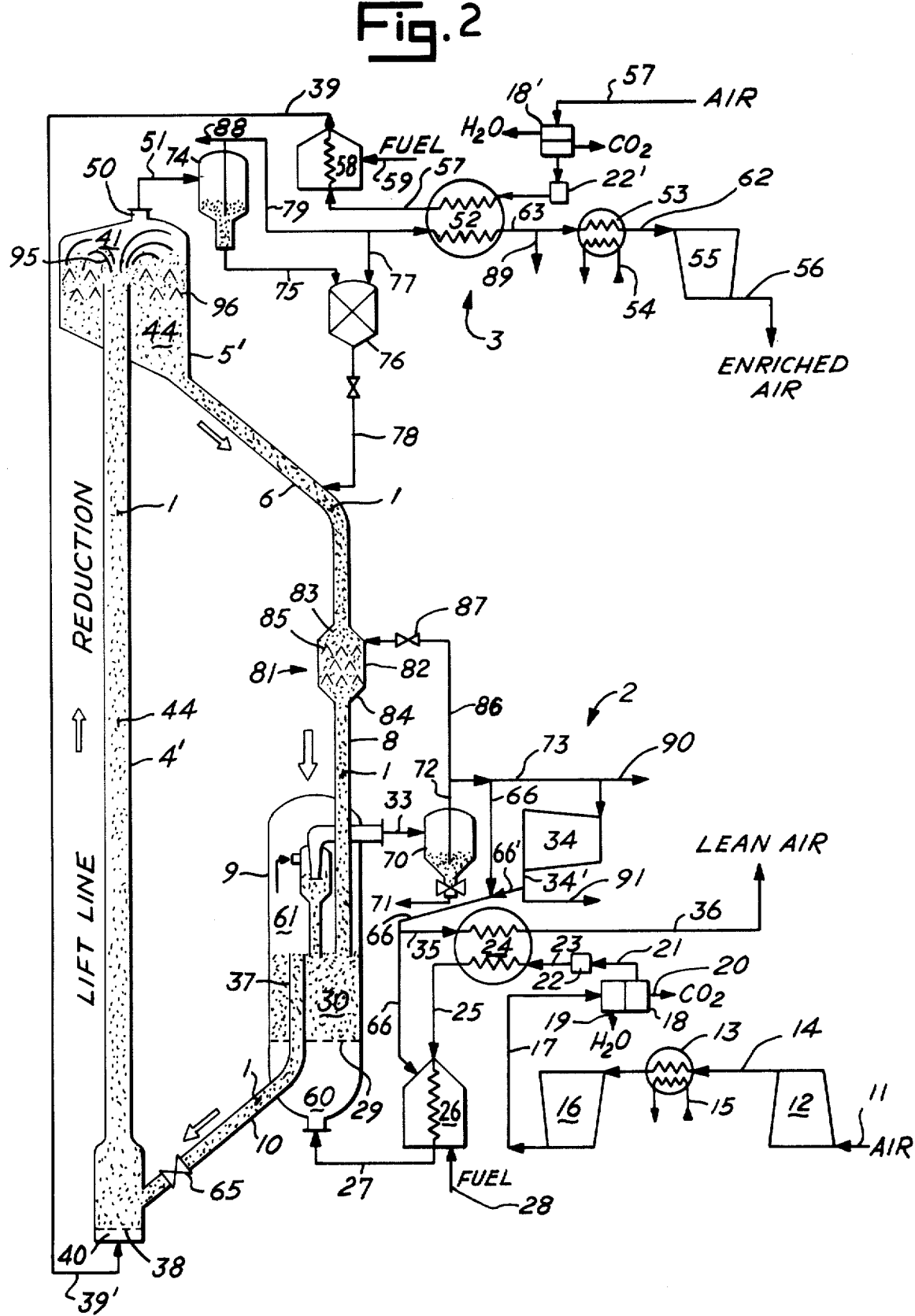

Still referring to both FIGURES for the operation, air is fed in through line 11 of the oxidation air preparation assembly 2 for processing and passing to the oxidation zone, lift leg 4 in FIG. 1 and oxidizer 9 in FIG. 2. The air is partially compressed in a first compressor 12 from which it is passed via line 14 through a water cooler 13 to remove some of the heat of compression. The cooler operates by heat exchange between the air in line 14 and cooling water passing through line 15. The air is then further compressed in compressor 16 up to the operating pressure for lift leg 4 (FIG. 1) or oxidizer 9 (FIG. 2). These two compressors, 12 and 16, may be a single multistage compressor which employs intercooling between stages, if desired. The compressed air in line 17 then passes through a conventional water and CO₂ removal means 18, which first condenses the water and removes it via line 19, and then removes the CO₂ via line 20. For example, silica gel, activated alumina, or molecular sieves may be used to dry the air down to a value of about 10 ppm H₂O. The drying should preferably occur prior to the removal of the CO₂. For the CO₂ removal, sodium hydroxide pellets, or calcined limestone or dolomite may be used. We prefer to use a combined removal medium which both dries and removes CO₂. The preferred material is a molecular sieve of the type identified as 13X made by the Linde Division of Union Carbide Corporation, which material may be regenerated from time to time as needed. The compressed air delivered to line 21 contains only about 10 ppm each of CO₂ and H₂O.

In a preferred embodiment of this process, this compressed air is then passed through a guard reactor 22 containing barium monoxide. Thus guard reactor serves two functions, first to prevent breakthrough of CO₂ and H₂O to the oxidation zone 4 or 9, and also to scavenge the remaining 10 ppm of CO₂ and H₂O from the gases in line 21. The barium monoxide in the guard reactor can be replaced or regenerated from time to time by calcining at temperatures on the order of 1600°–2000°F. The barium monoxide used in the guard reactor should initially be free from water and carbon dioxide so that it may function as a guard material for the main reactors. This can be ascertained by assay of the BaO material used in the reactor. The BaO may be used in powder, lump, or pellet form. Pellets can be prepared from BaO powder by dry pelletizing.

The compressed, dry and CO₂-free air in line 23 then passes through a heat recovery means 24 to partially raise the temperature of the air to near the operating temperature required in the oxidation zone 4 or 9. This heat recovery means operates by heat exchange with the lean air in line 35 coming from the oxidation zone (4 and 5 in FIG. 1, or reactor 9 via line 33 in FIG. 2), as described below in more detail. The partially heated air in line 25 is then passed into a heating means 26 to raise the temperature of the air to within the range of operation of the oxidation zone, that is, in the range of from about 1100°–1500°F. The heat for this operation may be supplied by input of fuel through line 28 and burning it in the heater 26 with either ambient air or some compressed hot lean air from line 73 via line 66, or 66'. The resultant air in line 27 will be hot, compressed, dry, $CO_2$-free air for use in the oxidation zone 4 or 9.

Referring specifically now to the lift line oxidizer embodiment of FIG. 1, the air passes in through an inlet into distribution space 60 in the bottom of the lift line 4, which is a long pipe capable of withstanding the temperatures and pressures of the process. The air passes upward through a perforated deck or distributor plate 29 to entrain the particles of the oxygen-acceptor bed material in an oxidizing bed zone 30 up to the special hopper 5. The oxygen acceptor bed materials in the oxidation zone 30 enter from overflow (down) leg 10 with the barium in the monoxide form. Under the required air pressure and temperature conditions above described, the monoxide form of the barium in the bed materials is oxidized (burned) to the peroxide form thereby accepting oxygen. Heat released during this oxidation is stored within the bed material by virtue of a rise in temperature of the active barium and the DQL, or other oxide compound of magnesium and calcium. DQL acts as an in situ heat sink capable of storing heat for subsequent reduction to barium monoxide in reductor 7.

During oxidation, oxygen in the air is accepted by the bed, thus leaving a lean air by-product in disengagement space 61. The bed materials form a fountain 95, and the residence time in hopper 5 is in part controlled by baffles 96 to provide sufficient time to evacuate the lean air. Since the DQL acts as a heat sink in the bed material the temperature of the exhausting lean air in the lean air exhaust line 33 is only raised a small amount, on the order of about 25° to 100°F.

Referring now to both FIGURES, the hot, compressed lean air in line 33 is then passed through an external cyclone 70 where bed particles entrained in the lean air are collected and discharged via outlet 71 to be returned to the solids delivery leg 6 (FIG. 1), or to be repelletized (FIG. 2). The fines-cleaned air from cyclone discharge 72 is passed via line 73 to be let-down through a turbine or expander 34. The power from the expander may be transferred to the compressors 12 and 16, or to the compressor 55 used on the reduction side of the process. Thereafter, the decompressed lean air in line 34' passes through lines 66', 66 and 35 back through the heat recovery means 24 with heat energy extracted therefrom being transferred to the partially heated air in line 25 as above-described. The low pressure, relatively cool lean air by-product is exhausted through line 36 to the atmosphere. Typically, this lean air contains from about 3–15% oxygen with the balance being nitrogen. Alternatively, this lean air can be further processed to recover the nitrogen values therefrom by conventional means.

Referring to FIG. 1, the particles of bed material in oxidation zone 30 in the lift leg 4 - hopper 5 assembly are held for at least a minimum residence time to permit oxidation of up to about 75%, typically 10 to 40%, of the barium monoxide to barium peroxide. The oxidized bed particles delivered to the disengaging hopper 5 then pass downwardly by gravity through the delivery leg 6 to the reductor 7, at a controlled rate by adjustment of solids control flow valve 80 and void gas disengager assembly 81 of any desired construction.

Referring to both FIGURES, typically the disengager comprises an enlarged body section 82 connected to the leg by tapered sections 83 and 84. Within the body section are inverted V-shaped baffles 85. Purge gas, e.g. lean air, is let into the assembly via line 86 and control valve 87 from cyclone discharge line 72. The disengager is operated at the same pressure as is in the reductor collection space 61. By control of valve 87 (and for FIG. 1 also valve 80), loss of enriched air through seal leg 8 is prevented. The length of seal leg 8 from just below the tapered section 84 to the bed 44 is just tall enough to maintain the differential in pressure between the reductor 7 and oxidation zone 30. The solids are then ready to continue downward flow at the controlled rate into the reductor 7 (FIG. 1) or oxidizer 9 (FIG. 2).

With reference to both FIGURES for the operation of the common reduction air preparation assembly 3, ambient air is fed in through line 57, and is then dried and the $CO_2$ removed in removal means 18' and guard reactor 22', as described above for similar means 18–22. The air is then heated in heat recovery means 52 by heat exchange with the hot product gas in line 79 to near the range of temperature desired for the operation. Additional heat as desired is provided by passing the air through heater means 58 wherein fuel added through line 59 may be burned. The prepared reduction air in line 39 has a temperature on the order of from about 1250° to 1550° F, and is below about 15 psia due to the downstream pull on the system by compressor 55. The prepared reduction air is then passed to the reductor 7, for the embodiment of FIG. 1, or to the lift leg 4, for the embodiment of FIG. 2.

Referring now to the reduction portion of the process embodiment of FIG. 1, the prepared reduction air incoming from line 39 passes through inlet 47 of reductor 7 into distribution space 48, and thence upwardly through the deck plate 46 to fluidize the bed 44. At the prevailing lower pressure and the temperature of the bed, some $BaO_2$ decomposes to oxygen and BaO. The oxygen mixes with and enriches the air incoming through inlet 47. The enriched air in collection space 49 in the reductor then passes through first, side entry, internal cyclone 67 which is disposed in the space 49 to collect all entrained bed particles larger than 100–200 mesh. The collected particles are returned directly to the bed by cyclone outlet pipe 68, while the lean air is exhausted from the reductor 7 by way of top discharge 69 and outlet 32. The heat stored in the bed materials supplies the endothermic heat of reduction via a drop in temperature, and the product gas 51 is approximately 25° to 100°F cooler than the inlet air 39. The enriched air in line 51 then passes through cyclone 74 where all fines below about 100 mesh are removed and passed through outlet 75 to lock hopper 76. Since the fines are in monoxide form, they are oxidized in lock hopper 76 by inlet of enriched air via line 77; optionally, air or oxygen may be used. The two cyclones 67 and 74 are chosen to collect the fines of relatively large size. This ensures removal from the system of DQL-$BaO_2$ particle fines before they become a mixed dust of $BaO_2$ and DQL. Preventing attrition of the feed particles to $BaO_2$ dusts assists keeping the particles in the desired size range, and in preventing plating out of the barium on reactor and line walls. The two cyclones are also disposed so that the fines are removed in oxidized form via line 78, for ease of repellitizing without degradation. The clean enriched air product gas is discharged from cyclone 74 via discharge 79. The product gas in line 79 passes through a heat recovery means 52, which delivers a partially cooled product gas to a water cooler 53. Water passing through line 54 cools the product gas still further to a level which can be handled by compressor 55, which is operating in a manner of a vacuum pump to help pull gases through the reductor. A final product gas is then delivered to line 56, having from 22–75% oxygen, typically, 25–45% oxygen.

With respect to both FIGS. 1 and 2 embodiments, by virtue of the riser heights of the seal leg 8 and overflow leg 10, as defined by the distance between the respective deck plates 46 and 29 and the top of the sections 45 and 37, the residence time of the bed solids in the reductor and oxidizer may be controlled. Additional residence time control of solids valve 65 in overflow leg 10 and valve 80 in delivery leg 6. These parameters may be controlled to provide a residence time in each of the reactor or lift leg and hopper, of from 6 seconds to 10 minutes, preferably 9 seconds to 1.3 minutes.

Continuing with the preferred process embodiment of FIG. 1 the fluidized material overflows into riser section 45 of overflow leg 10, and flows by gravity to the bottom of the lift leg 4. The placement of deck plate 29 in the bottom of the lift leg 4 provides a distribution space 60 for distribution of incoming gas from line 27. The gas in line 27 is of sufficient volume and velocity to transport solid bed particles upwardly in lift leg 4 to the gas/solids disengaging hopper 5. Header or disengaging space 61 is provided in the top of hopper 5 to permit the oxidized bed particles to settle and separate the gas therefrom for passage via delivery pipe 6 to the reactor.

Turning to the reduction portion of the process embodiment of FIG. 2, the prepared reduction air is then piped to inlet line 39' at the base of the lift leg 4, from whence it passes into the distribution space 40, through the deck plate 38 and entrains the bed particles 1 to the hopper 5 wherein fountain 95 forms. Baffles 96 assist in controlling residence time for some of the $BaO_2$ in the bed to decompose to oxygen and BaO at the prevailing lower pressure and temperature of bed 44.

The oxygen mixes with and enriches the air incoming through line 39'. The enriched air in collection space 41 in hopper 5 then passes through outlet 50 to product delivery line 51. The operation of the reduction air preparation and product gas collection system 3 in FIG. 2 is like that of FIG. 1, with the exception that the oxidized fines in line 78 are returned to the delivery leg 6, which does not need the solids flow control valve 80. Enriched air is collected from line 56 having from 22–75% oxygen, typically 25–45% oxygen.

The remainder of the bed particles circulation cycle in the FIG. 2 embodiment is analogous to that of FIG. 1 as described above and as illustrated below in the examples.

EXAMPLES

As illustrative working examples, and not meant as limiting, the following are parameters which may be involved in the operation of the process of the instant invention.

The apparatus of the embodiments of FIGS. 1 and 2 may have the following common typical parameters for 600 tons/day production: the reactor may have an internal diameter of approximately 10.5 feet and a height of about 40 feet. $DQL/BaO_2$ bed material of 70/30% by weight composition is provided in the apparatus and may be prepared from $BaO_2$ and DQL or from $BaCO_3$ and dolomite as above described.

In operation, inlet air at 60°F and 14.7 psia is compressed by compressor 12 to 27.9 psia and a temperature of 291°F in line 14. Water cools this air to a temperature of 100°F just prior to passing into compressor 16. Compressor 16 then raises the pressure of the inlet air to about 53 psia in line 17, and after passing through the heat recovery means 24 the temperature of this air is raised to about 857°F in line 25. $CO_2$ and water are removed to about 0 ppm by xeolite-containing removal means 18 and BaO guard reactor 22. Fuel is fed to heater 26 through line 28 to raise the oxidation feed air temperature to approximately 1300°F in line 27.

Lean air collected in disengagement space 61 is at a temperature of approximately 1350°F. This lean air comes off into line 73 and is then let down through expander 34 to a temperature of approximately 993°F and pressure of 15.7 psia. Energy from expander 34 may then be delivered to one or more compressors 12, 16 and 55. The heat recovery means 24 transfers heat energy from the lean air in line 35 back to the incoming air in line 25. The cooled lean air in line 36 is produced at approximately 291°F and 14.7 psia.

When desired, the rate of flow through the heat recovery device 24 may be adjusted to deliver a hot, lean air by-product in line 36 at a temperature above 291°F and less than about 1000°F. Where it is desired to burn some of the lean air in the heater means 58 in the reduction air preparation assembly 3 or in the heater 26 in oxidation air preparation assembly 2, the hot lean air may be conducted directly to the heaters 58 and/or 26. Hot lean air at a temperature of 1000–1300°F may be withdrawn from lines 90 (compressed) or 91 (approximately atmospheric pressure).

In the preparation of air for the reduction zone, ambient air is drawn in through line 58 at a nominal temperature of 60°F. By transfer of heat from the heat recovery means 52 from line 79 to line 57, this inlet air is raised to a temperature of approximately 1250°F. In heater 58 heat is added to raise the temperature to about 1350°F in line 39 for delivery to the reduction zone.

The bed zone 44 and the product gas in disengagement space 49 is at a temperature of approximately 1300°F. This product gas in line 51 has an oxygen content of approximately 30 mole % by virtue of the evolution of oxygen from decomposing barium peroxide in the bed zone 44. The hot product gas in line 79 is heat exchanged with the gas in line 57 with the temperature being reduced from about 1300°F to about 249°F. The temperature can be further reduced by passing the gas through cooler 53. The resultant air in line 62 is at approximately 100°F. Compressor 55, operating as a vacuum pump, pulls all air through the reduction zone. This compressor then delivers to line 56 a product gas of 30 mole % of oxygen at approximately 14.7 psia and a tmeperature above about 150°F.

As an important option in this process, where desired, a hot product gas may be directly tapped off line 79 via line 88 to obtain a hot, oxygen-rich product gas at a temperature of about 1300°F. In another embodiment, a gas of intermediate temperature may be withdrawn from line 63 via line 89 at a temperature of about 249°F.

The following table shows other pertinent parameters for these working examples, with Examples 1–3 referring to the preferred embodiment of FIG. 1 (lift line oxidizer), and Examples 4–6 referring to FIG. 6 (lift line reductor):

dence time is reduced, both the pressure and horsepower requirements of the system are reduced.

It should be understood that various modifications

TABLE I

|  | FIG. 1 Lift line Oxidizer | | | FIG. 2 Lift Line Reductor | | |
|---|---|---|---|---|---|---|
| Example Parameter | 1 | 2 | 3 | 4 | 5 | 6 |
| Bed Source Material | BaO$_2$/ DQL | BaO$_2$/ DQL | BaCO$_3$/ Dolomite Pellets | BaO$_2$/ DQL | BaO$_2$/ DQL | BaCO$_3$/ Dolomite Pellets |
| Pressure in Solids Disengager Hopper at 61, psia | 42.3 | 42.3 | 42.3 | N.A. | N.A. | N.A. |
| Pressure in Solids Disengager Hopper at 41, psia | N.A. | N.A. | N.A. | 6.7 | 6.7 | 6.7 |
| Pressure in Reactor Space 49, psia | 6.7 | 6.7 | 6.7 | N.A. | N.A. | N.A. |
| Pressure in Reactor Space 61, psia | N.A. | N.A. | N.A. | 42.3 | 42.3 | 42.3 |
| Height of Delivery leg 6, and sell leg 8 ft. | A | A | A | 57 | 57 | 57 |
| Height of overflow leg 10, ft. | 58 | 58 | 58 | A | A | A |
| Pressure below oxidation zone distributor plate in 60, psia | 43.6 | 43.1 | 43.4 | 43.5 | 44.3 | 43.3 |
| Pressure below Reduction Zone distributor plate in 48, psia | 7.8 | 8.2 | 7.4 | N.A. | N.A. | N.A. |
| Pressure below Reduction Zone distribution plate, in 40, psia | N.A. | N.A. | N.A. | 12.2 | 10.3 | 11.5 |
| Solids Residence Time, min. Oxidation Zone | 0.15 | 0.4 | 0.15 | 0.15 | 0.4 | 0.15 |
| Reduction Zone | 0.65 | 1.3 | 0.5 | 0.65 | 1.3 | 0.5 |
| Height of Lift Line 4, ft. | 159 | 136 | 143 | 694 | 589 | 670 |
| Solids conversion, theoretical max. percent | 13 | 20 | 15 | 13 | 20 | 15 |
| Rate of Solids circulation, 10$^6$ lbs./hr. | 13.569 | 8.820 | 11.760 | 13.569 | 8.820 | 11.760 |

The value A in the above table refers to the fact that the height depends on the equipment layout, with the angle of the leg should not be more than 45° to the vertical and smaller than the angle of repose for the solids or particles. The pressure in the spaces 60, 48, 40 below the distributor plates depends on the residence time of the solids and the circulation rate. As the residence time is reduced, both the pressure and horsepower requirements of the system are reduced.

within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. A process for enriching air with oxygen from air by alternately stripping oxygen from a barium-containing oxygen acceptor composition bed material in the presence of air and causing oxygen to be accepted from air by said bed material comprising the steps of:
   a. circulating a hot barium-containing bed material in a peroxide state through a reduction zone,
   b. passed heated air at a pressure below about 15 psia through said bed material in said reduction zone to enrich the oxygen content of said air by stripping oxygen from said bed material and converting a portion of barium peroxide therein to the monoxide state,
   c. circulating said converted bed material containing barium monoxide through a second, oxidizing zone,
   d. passing heated, pressurized air through said bed material in said oxidizing zone so that said bed material accepts oxygen by converting a portion of the barium monoxide therein to barium peroxide, and to produce a lean air by-product gas,
   e. maintaining the pressure in said oxidizing zone in a range of from about 1.5 to 10 times the pressure in said reduction zone,
   f. returning said bed to said reduction zone,
   g. maintaining said bed in a fluidized condition in one of said zones,
   h. maintaining said bed in an air-entrained, upwardly moving condition in the other of said zones, and
   i. collecting an enriched air product gas from said reduction zone having from about 22 to 75 mole percent oxygen therein.

2. A process as in claim 1 wherein the bed in said reduction zone is maintained in said fluidized condition and said oxidizing zone bed is maintained in said air-entrained condition.

3. A process as in claim 2 wherein the residence time in said reduction zone ranges from about 5 seconds to 15 minutes.

4. A process as in claim 2 wherein the residence time in said oxidizing zone ranges from about 1 second to 10 minutes.

5. A process as in claim 3 wherein the residence time in said oxidizing zone ranges from about 1 second to 10 minutes.

6. A process as in claim 2 wherein the temperature in said reduction zone ranges from about 1250° to 1550°F.

7. A process as in claim 2 wherein the temperature in said oxidizing zone ranges from about 1100° to 1500°F.

8. A process as in claim 6 wherein the temperature in said oxidizing zone ranges from about 1100° to 1500°F.

9. A process as in claim 5 wherein the temperature in said reduction zone ranges from about 1250° to 1550°F.

10. A process as in claim 2 wherein said oxygen acceptor bed material comprises an active composition of a barium oxide with MgO and CaO.

11. A process as in claim 10 wherein said bed material is a binary composition of a barium oxide with a compound of the oxides of Mg and Ca.

12. A process as in claim 11 wherein said Mg and Ca oxides compound is derived from naturally occurring dolomite.

13. A process as in claim 12 wherein said derived compound is a dolomitic quicklime.

14. A process as in claim 13 wherein said bed material is in granular form in a size ranging from about 40 mesh to 320 mesh.

15. A process as in claim 11 wherein the heated air passed into both said oxidation and said reduction zones is passed through a BaO-containing guard reactor to remove residual $CO_2$ and $H_2O$ prior to introduction into said zones.

16. A process as in claim 1 wherein the bed in said reduction zone is maintained in an air-entrained condition, and said bed in said oxidation zone is maintained in a fluidized condition.

17. A process as in claim 16 wherein said oxygen acceptor bed material comprises an active composition of a barium oxide with MgO and CaO.

18. A process as in claim 17 wherein said bed material is a binary composition of a barium oxide with a compound of the oxides of Mg and Ca.

19. A process as in claim 18 wherein said Mg and Ca oxides compound is derived from naturally occurring dolomite.

20. A process as in claim 19 wherein said derived compound is a dolomitic quicklime.

21. A process as in claim 20 wherein said bed material is in granular form in a size ranging from about 40 mesh to 320 mesh.

22. A process as in claim 1 which includes the step of recovering a hot enriched air product from said reduction zone.

23. A process as in claim 1 which includes the step of recovering heat energy from said enriched air product.

24. A process as in claim 1 which includes the step of recovering hot lean air from said reduction zone.

25. A process as in claim 1 which includes the steps of recovering heat and pressure energy from said lean air by-product gas.

26. A process as in claim 1 wherein the pressure in said oxidizing zone is maintained in the range of from about 1.5 to 8 times the pressure in said reduction zone.

27. A process as in claim 26 wherein the pressure in said oxidizing zone is maintained in the range of from about 1.5 to 7 times the reduction zone pressure.

28. A process as in claim 2 wherein the pressure in said oxidizing zone is maintained in the range of from about 1.5 to 8 times the pressure in said reduction zone.

29. A process as in claim 28 wherein the pressure in said oxidizing zone is maintained in the range of from about 1.5 to 7 times the reduction zone pressure.

30. A process as in claim 10 which includes the step of maintaining the size of bed material particles above about 200 mesh by selectively removing fines of bed materials in composition form before attrition reduces the composition to individual components such that the barium plates out.

* * * * *